Patented Sept. 13, 1927.

UNITED STATES PATENT OFFICE.

HENRY BLUMENBERG, JR., OF MOAPA, NEVADA, ASSIGNOR TO STOCKHOLDERS SYNDICATE, OF LOS ANGELES, CALIFORNIA, A CORPORATION OF CALIFORNIA.

PROCESS OF MAKING SODIUM SULPHITES AND BORIC ACID.

No Drawing.     Application filed September 4, 1924. Serial No. 735,880.

My invention relates to a process of making sodium sulphites and boric acid.

It is an object of this invention to provide a simple and economical process of producing sodium sulphite and boric acid by treating borax with sulphur dioxide.

My process is based on an economic condition now existing in the borax industry. The common practice in the production of boric acid started with crude borate of lime ores as the raw material, which was treated with some mineral acid. The boric acid produced by the reaction of the acid on the borate of lime was separated by filter pressing the mixture and subsequently crystallizing out the boric acid by any suitable or preferred means.

I have discovered that sodium sulphite and sodium bi-sulphite, may be produced direct from borax with sulphur dioxide.

Heretofore in the commercial production of boric acid from borax a large investment was required to erect a sulphuric acid plant at the point of production, which is not always advisable, as the acid plants must have a certain volume of business to make their operation profitable. If this condition does not exist, the only other way to treat the borax to make boric acid is to ship it to some point where it can be handled profitably on a commercial scale.

My invention consists of the steps hereinafter described and claimed.

A concentrated borax solution is treated with sulphur dioxide, producing boric acid and sodium sulphite in accordance with the following equation:

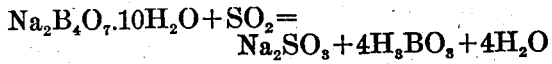
$$Na_2B_4O_7.10H_2O + SO_2 = Na_2SO_3 + 4H_3BO_3 + 4H_2O$$

If the treatment with sulphur dioxide is continued to the point of super-saturation sodium bi-sulphite is produced as follows:

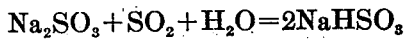
$$Na_2SO_3 + SO_2 + H_2O = 2NaHSO_3$$

During the operation of the process, the point when the formation of boric acid is completed, is well marked. The boric acid settles down as a sparkling precipitate. When the reaction indicated in the first chemical equation above set forth is completed the mixture consists of normal sodium sulphite and a precipitate of boric acid. Any further treatment with sulphur dioxide will convert the normal sodium sulphite to sodium bi-sulphite, as indicated in the second chemical equation.

The formation of the bi-sulphite is indicated by a cloudy precipitate. When this occurs the operator knows that the first reaction is complete and he stops the further introduction of sulphur dioxide and separates by filtration or any other suitable means the precipitated boric acid from the liquid.

If it is desired to make the normal sodium sulphite, the remaining liquid is evaporated and the sodium sulphite is crystallized out and separated from the liquid in any preferred manner. If, on the other hand, it is desired to produce sodium bi-sulphite, then the treatment with sulphur dioxide is continued until all the normal sulphite has been converted into bi-sulphite.

The solubility of boric acid is slight and small quantities thereof that stay in solution with the sulphite are not objectionable, especially if the sulphites are used for cleansing wine barrels, beer barrels and the like, and as cleansing solutions in laundries.

A modification of this process may be employed without using a borax solution. The crystals of borax are moistened and placed in a thin layer on a porous material and sulphur dioxide is passed over or through the layer. The sodium sulphite formed is liquid and will drip through the layer and through the porous medium, leaving the boric acid on the porous material.

I claim:

A process of making sodium sulphite and boric acid, comprising treating a borax solution with sulphur dioxide until the reaction forming normal sodium sulphite and boric acid is complete the end of said reaction being indicated by the formation of a cloudy precipitate of sodium bi-sulphite, separating the precipitated boric acid from the mixture and treating the remaining mixture with sulphur dioxide to form sodium bi-sulphite.

In testimony whereof I have signed my name to this specification.

HENRY BLUMENBERG, JR.